United States Patent Office 2,952,668
Patented Sept. 13, 1960

2,952,668

N-VINYL-3-MORPHOLINONE COPOLYMERS

Forrest A. Ehlers, Walnut Creek, Calif., assignor to The Dow Chemical Company, Midland, Mich., a corporation of Delaware No Drawing. Filed Apr. 16, 1958, Ser. No. 728,801

9 Claims. (Cl. 260—80.3)

The present invention resides in the general field of organic chemistry and contributes especially to the polymer art. More particularly, this invention relates to novel, dye-receptive, normally solid copolymers of various N-vinyl-3-morpholinone monomers, particularly unsubstituted N-vinyl-3-morpholinone (hereinafter, for convenience and simplicity, referred to as NVM and VM, respectively) and various cross-linking, polyfunctional monomers, which copolymers are cross-linked and generally water-insoluble products.

Many of the polymers and copolymers that are comprised of NVM monomers are attributed with a pronounced capacity for accepting a wide variety of dyestuffs. As a consequence, it is beneficial to employ such polymeric materials as dye-assisting adjuvants in synthetic fiber-forming polymeric compositions that may ordinarily be difficult to dye, especially in acrylonitrile polymer compositions, in order to enhance the dye-receptive properties of such compositions. Although their utilization in this manner is desirable, the conventional polymers and copolymers of NVM monomers, particularly homopolymers of VM, are quite susceptible to being dissolved in water. This characteristic, as can be appreciated, may diminish the complete advantage that might otherwise be secured by their employment as dye-assisting adjuvants in polymeric fiber-forming compositions. Dissatisfactory results may be especially manifest when the compositions are fabricated into such shaped articles as fibers and the like including cloth and fabric constructed therefrom which are commonly subjected to the extractive influence of water whenever they are washed, scoured or laundered during their manufacture or in the course of their useful life as a textile article, or both.

As may be apparent, one of the undesirable consequences of employing a water-soluble dye-assisting adjuvant in fiber-forming polymeric compositions is to require that a sufficiently large quantity of the additament be incorporated in the composition to ensure that the shaped articles, particularly textile fibers, prepared from such composition may have an acceptable dye-receptivity despite dissolution losses of the adjuvant that may be encountered prior to dyeing the shaped article. Frequently the quantities of the adjuvant that must be employed to compensate for dissolution losses are so large as to deleteriously influence the properties of the composition. Another difficulty that may be encountered when employing water-soluble dye-assisting adjuvants in polymeric fiber-forming compositions is to impart poor washfastness to the dyed, shaped articles that may be prepared from the compositions.

It would be advantageous, and it is among the principal objects of the present invention, to provide dye-receptive copolymers of NVM monomers, especially copolymers of VM, that are insoluble in water and particularly adapted for being employed and permanently retained as dye-assisting adjuvants in synthetic polymeric fiber-forming compositions, especially in acrylonitrile polymer compositions.

To the attainment of these and related ends, a dye-receptive, water-insoluble copolymer that is especially well suited for being employed as a dye-assisting adjuvant in synthetic, fiber-forming, polymeric compositions, particularly acrylonitrile polymer compositions, is comprised of of copolymer of an NVM monomer and a cross-linking, polyfunctional monomeric material that is copolymerizable therewith. Advantageously, as mentioned, the NVM monomer that is copolymerized with the polyfunctional monomer is VM. It is usually beneficial for the copolymers of the present invention to contain a major proportion (i.e., at least 50 weight percent) of the NVM monomer polymerized in the copolymer. Usually, for example, it is desirable for the copolymer to contain between about 80 and 98 percent by weight of the NVM monomer polymerized in the copolymer molecule, particularly when the copolymer is intended for application as a dye-assisting adjuvant. In certain instances it may be more satisfactory for a copolymer that is intended for such application to contain in the neighborhood of 90 percent by weight of the NVM monomer polymerized in the copolymer molecule. In many cases, however, especially if the polyfunctional comonomer has a dye-receptive nature (as occurs with such monomers as methylene-bis-acrylamide and its close homologues) it may be satisfactory for the copolymer to contain between about 2 and 98 weight percent of the NVM monomer copolymerized in the polymer molecule.

Many polyfunctional monomeric materials may be employed for providing the cross-linked copolymers that are utilized in the practice of the present invention. In general, such polyfunctional monomers may be characterized in having a plurality of at least two ethylenically unsaturated units (which frequently are vinyl groups) and in being copolymerizable with NVM monomers. The latter features, incidentally, may be easily determined by relatively simple and readily apparent testing by means that will be obvious to those who have the skill of their calling.

Typically representative of the polyfunctional monomers that may be used in the practice of the present invention are those set forth in the following tabulations which are intended to be illustrative and not limiting and to fully imply the close equivalent homologues and isomers of the indicated compounds:

*Table A.—Vinyl-containing hydrocarbons*

Divinyl benzene
1,5-dipentadiene

*Table B.—Eethylenically unsaturated polyalcohols*

Diallyl glycerol
Diallyl sorbitol
Diallyl pentaerithritol
Diethylene glycol divinyl ether

*Table C.—Acrylic and methacrylic acid derivatives*

Alkylene and alkylidene-bis-acrylamides
Ethylene diacrylate
Allyl acrylate
Polyalkylene glycol diacrylates

*Table D.—Ethylenically unsaturated esters of polybasic acids or pseudo acids*

Diallyl adipate
Diallyl maleate
Diallyl fumarate
Triallyl cyanurate
Triallyl isocyanurate

*Table E.—Others*

Vinyl crotonoate
Diethyleneglycol-bis-allyl-carbonate
Diallylbenzene phosphonate
2,4-diallyloxy-6-amino-s-triazine
Triacrylylperhydrotriazine Frequently, polyfunctional monomers of the type set forth in Tables C and D are more advantageous to employ. It is oftentimes of most benefit to use a dye-receptive, water-insoluble, cross-linked copolymer of the indicated variety that contains as the polyfunctional monomeric ingredient or constituent one that has been selected from the group consisting of methylene-bis-acrylamide, divinyl benzene, diallyl glycerol, tetraethyleneglycol dimethacrylate, triallyl cyanurate, triacrylylperhydrotriazine or their mixtures.

The NVM monomers that are used for preparation of the dye-receptive, water-insoluble, cross-linked copolymeric products are of the general structure:

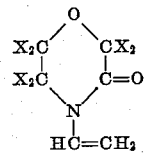

(I)

wherein each X is independently selected from the class consisting of hydrogen, alkyl radicals containing from 1 to about 4 carbon atoms, and aryl radicals containing from 6 to about 10 carbon atoms. These monomers and their preparation are disclosed in the copending application for United States Letters Patent having Serial Number 710,912, which was filed January 24, 1958, by the present applicant and others. Typical of such monomers, besides the highly desirable VM (i.e., wherein all of the X substituents in Formula I are hydrogen), are N-vinyl-5-methyl-3-morpholinone, N-vinyl-2-methyl-3-morpholinone, N-vinyl-4-methyl-3-morpholinone, N-vinyl-5-ethyl-3-morpholinone, N-vinyl-5-phenyl-3-morpholinone and the like. Morpholinone compounds, with less precision, may sometimes be referred to as morpholones.

The monomeric N-vinyl-3-morpholinone compounds may advantageously be prepared by a direct vinylation of a suitable 3-morpholinone compound with acetylene in a manner analogous to that utilized for the vinylation of various lactams, as is well known in the art.

The copolymers of the present invention may be prepared by polymerizing the monomeric ingredients at an elevated temperature under basic conditions in an aqueous (or other suitable solvent) medium with the assistance of a suitable catalyst such as a peroxy or azo type polymerization catalyst. Thus, the monomers may be dispersed in water containing a sufficient quantity of ammonium hydroxide to provide a pH of between about 6 and 12 in the reaction mass and may be polymerized under such basic conditions with the assistance of hydrogen peroxide, potassium persulfate, $\alpha,\alpha'$-azobisisobutyronitrile or the like as a catalyst. While temperatures between about 20° C. and the boiling point may be suitable, it is ordinarily satisfactory to conduct the polymerization at a temperature of about 50 to 80° C. Usually, depending on the specific factors that may be involved, the polymerization may be accomplished satisfactorily within a time period of from 10 to about 60 hours.

The polymerization system that is employed for the preparation of the copolymers of the present invention may consist of as much as 50 or more percent by weight of the monomers to be polymerized in the aqueous or other solvent medium. The amount of monomeric material that is provided in the polymerization system may be influenced somewhat by the subsequent manner in which it may be desired to utilize the copolymers, especially when they are intended to be employed as dye-assisting adjuvants in polymeric compositions.

Thus, if it is intended to incorporate them as blended copolymers in a fiber-forming composition prior to its fabrication into shaped articles, the polymerization system may, if desired, contain about equal proportions by weight of the charged monomeric materials and the aqueous polymerization medium. In such cases, the copolymer product may ordinarily be obtained as a gel (particularly when the polymerization has been accomplished without agitation) that, after being dried and isolated from unreacted monomer, may be incorporated in the fiber-forming composition. The copolymer may be physically reduced by comminution to a sufficiently fine state to permit its dispersion in spinnable condition throughout the blended fiber-forming composition.

If the incorporation of the copolymer as a dye-assisting adjuvant in a fiber-forming composition is to be achieved by impregnation therewith of an already formed shaped article of the composition, it may be desirable to effect the polymerization so as to directly form the polymerization system as a suitable applicating emulsion or suspension of the copolymer product. For such purposes, the polymerization system may be prepared to contain as little as 5 or 10 percent by weight of the copolymerizing monomeric ingredients. Preferably, such a polymerization may be conducted under the influence of vigorous agitation to facilitate preparation of the copolymer emulsion. It may also be beneficial under such circumstances to incorporate a dispersant or emulsifying agent in the polymerization system to facilitate obtaining a stable and homogeneous emulsified product. Such a method for preparing the copolymers of the invention may be especially appropriate when they are intended to be applied as dye-assisting adjuvants to polyacrylonitrile fibers that are derived from aquagels in the course of their manufacture. In such instances, the emulsified copolymer may be impregnated into the fiber while it is in an aquagel condition in order to obtain the desired dye-receptive copolymer-containing fiber product.

The copolymers of the invention, particularly those prepared with VM, have the capacity to accept and retain many of a wide variety of dyestuffs, including acetate, direct, acid and vat dyes. They are thus adapted to imbue the polymeric fiber-forming compositions in which they may be incorporated with such desirable dye-receptive properties. In addition, probably due to the cross-linking effect which is obtained in their molecular configurations, they are insoluble in water and may thus be permanently retained in shaped articles from polymeric fiber-forming compositions in which they are incorporated, despite exposure and subjection of the shaped articles to water under extremely extractive conditions. This, of course, permits minimum quantities of the copolymers to be employed in the fiber-forming compositions so that they retain their desirable fiber-forming properties in a substantially undiminished manner. Frequently, for example, a quantity of the copolymer that is only in the amount of about 10 percent or less by weight of the polymer content of a fiber-forming composition may be employed satisfactorily as a dye-assisting adjuvant. Furthermore, the permanent retention of the water-insoluble copolymers of the invention facilitates the achievement of dyed, shaped articles from such compositions that have excellent washfast characteristics.

The invention is further illustrated in and by the following examples wherein, unless otherwise indicated, all parts and percentages are to be taken by weight.

*Example I.*—About 20 parts of N,N'-methylenebisacrylamide and 20 parts of VM were dissolved in 160 parts of water to which mixture there was added about 0.8 part of potassium persulfate. The resulting mixture was then adjusted to a pH of about 6 with ammonium hydroxide, then polymerized at about 50° C. for 16 hours to obtain a cross-linked, water-insoluble copolymer product containing about 40 percent of VM and 60 percent of the cross-linking monomer therein. About 73 percent of the charged monomeric ingredients were recovered as a white, cross-linked, water and organic solvent-insoluble copolymeric product. The copolymeric product was an excellent dye-assisting adjuvant when incorporated in polymer compositions in the manner described in the fourth and fifth examples.

*Example II.*—Four water-insoluble copolymers were prepared by copolymerizing mixtures of VM and tetraethyleneglycol dimethacrylate at 50° C. for 24 hours using 160 parts of water and 0.4 part of α,α'-azobisisobutyronitrile as a catalyst in each of the polymerization masses which had all been adjusted to a pH of 6 prior to commencement of the polymerization. The charges and results are set forth in the following tabulation:

| Charge | Run 2a | Run 2b | Run 2c | Run 2d |
|---|---|---|---|---|
| Polyfunctional monomer parts | 4 | 8 | 20 | 32 |
| VM do | 36 | 32 | 20 | 8 |
| Insoluble copolymer do | 7 | 11 | 25 | 34 |
| Insoluble copolymer percent | 16.3 | 28.2 | 62.0 | 84.5 |

Each of the copolymer products, when incorporated in difficult to dye polymer compositions, such as polyacrylonitrile, were found to be excellent dye-assisting adjuvants therefor.

*Example III.*—Analogous excellent results were achieved when the procedures of Examples I and II were duplicated excepting to employ 2,4-diallyloxy-6-amino-s-triazine and diallyl glycerol as the polyfunctional monomers for the copolymer product. Commensurate good results are also obtained when the same procedures are followed excepting to utilize N-vinyl-5-methyl-3-morpholinone as the NVM monomer.

*Example IV.*—About 9 parts of the copolymer product of Example I that had been comminuted by mechanical means to a very fine particle size were blended with a solution of 81 parts of fiber-forming polyacrylonitrile in 737 parts of a 60 percent aqueous solution of zinc chloride. Films were cast of the resulting composition, washed thoroughly with water, then dyed. Their receptivity of Calcodur Pink 2BL, a direct dyestuff (Color Index 353) was found to be excellent. Their reflectance values, as described in the following Example V, were in the neighborhood of 18.

*Example V.*— The blended mixture of Example IV is wet spun according to a conventional procedure through a 306 hole spinnerette having individual round orifices that are about 0.010 inch in diameter into an aqueous zinc chloride-containing coagulating bath. After being oriented by stretching and dried, the resulting 2.5 denier fibers are found to have a tenacity of about 2.5 grams per denier, a dry yield of about 0.95 gram per denier and an elongation of about 44 percent. The fibers dye readily with Amacel Scarlet BS, Calcodur Pink 2BL, Calcocid Alizarine Violet and Xylene Milling Black.

When the finished fibers are subjected to a standard scouring procedure in a strong, aqueous detergent solution at the boil, only about 1.5 percent of the copolymer, based on the amount of copolymer present in the composition, is found to be removed. In comparison, polyacrylonitrile fibers that contain an aquivalent amount of conventional homopolymeric poly-N-vinyl-3-morpholinone that has been incorporated in the fiber by impregnation while it is in an aquagel condition are frequently observed to lose as much as 20 to 30 percent of the homopolymer upon scouring under similar conditions.

The product fibers are dyeable with a great diversity of dyestuffs. When a sample of the fibers are dyed with 4 percent Calcodur Pink 2BL, they are found to have a reflectance value of about 16, indicating a deeply dyed product. The reflectance value of a dyed fiber is a spectrophotometrically measurable indication of its dye-receptivity since it indicates the amount of monochromatic light from a standard source having a wave length of about 520 millimicrons that is reflected from a dyed sample. The foregoing numerical reflectance value represents the relative comparison of the amount of light that is reflected from the dyed sample with that which is reflected from a standard white tile reflector having an arbitrarily assigned reflectance value of 316. Lower reflectance values are an indication of better dye-receptivity in the fiber. By way of illustration, a reflectance value of about 25 for fibers from acrylonitrile polymer compositions that are dyed with 4 percent Calcodur Pink 2BL is generally considered by those skilled in the art to represent a degree of dye-receptivity that readily meets or exceeds the most rigorous practical requirements and is ordinarily assured of receiving general commercial acceptance and approval. Frequently a reflectance value as high as 30-40 may be satisfactory for many purposes.

Similar excellent results may be obtained when other proportions of VM are polymerized in the copolymer products of the invention and when other NVM monomers of the Formula I are utilized for their manufacture. Equivalent results may also be obtained when other of the polyfunctional comonomers mentioned in Tables A–E, or their readily apparent equivalents, are employed in the preparation of the dye-receptive and water-insoluble copolymers.

What is claimed is:

1. Dye-receptive, water-insoluble, normally solid, cross-linked copolymer of (A) from between about 2 and 98 weight percent, based on the copolymer, of an N-vinyl-3-morpholinone monomer of the formula:

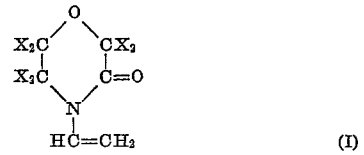

(I)

wherein each X is independently selected from the group consisting of hydrogen, alkyl radicals containing from 1 to about 4 carbon atoms, and aryl radicals containing from 6 to about 10 carbon atoms, and (B) between about 98 and 2 weight percent, based on the weight of the copolymer, of a cross-linking, polyfunctional, ethylenically unsaturated monomer that contains at least 2 polymerizable ethylenically unsaturated constituents and is copolymerizable with said monomer of the Formula I.

2. The copolymer of claim 1, containing from about 50 to 98 weight percent of the monomer of Formula I.

3. The copolymer of claim 1, containing about 90 weight percent of the monomer of Formula I.

4. The copolymer of claim 1, wherein said monomer of the Formula I is N-vinyl-3-morpholinone.

5. The copolymer of claim 1, wherein said polyfunctional monomer is methylene-bis-acrylamide.

6. The copolymer of claim 1, wherein said polyfunctional monomer is divinyl benzene.

7. The copolymer of claim 1, wherein said polyfunctional monomer is diallyl glycerol.

8. The copolymer of claim 1, wherein said polyfunctional monomer is tetraethyleneglycol dimethacrylate.

9. The copolymer of claim 1, wherein said polyfunctional monomer is triallyl cyanurate.

References Cited in the file of this patent

UNITED STATES PATENTS

| 2,801,224 | Greer | July 30, 1957 |
| 2,818,362 | Drechsel | Dec. 31, 1957 |